April 1, 1969     B. F. PAUL     3,435,501
METHOD AND MEANS FOR MAKING ELLIPTOIDS
Filed June 22, 1966
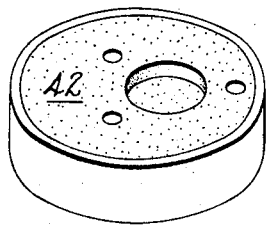
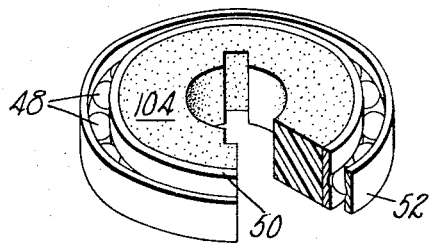
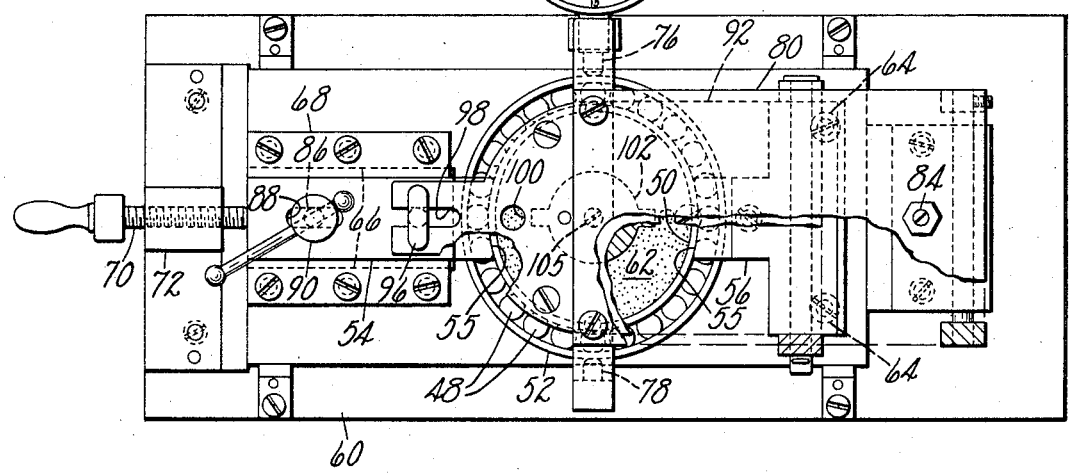
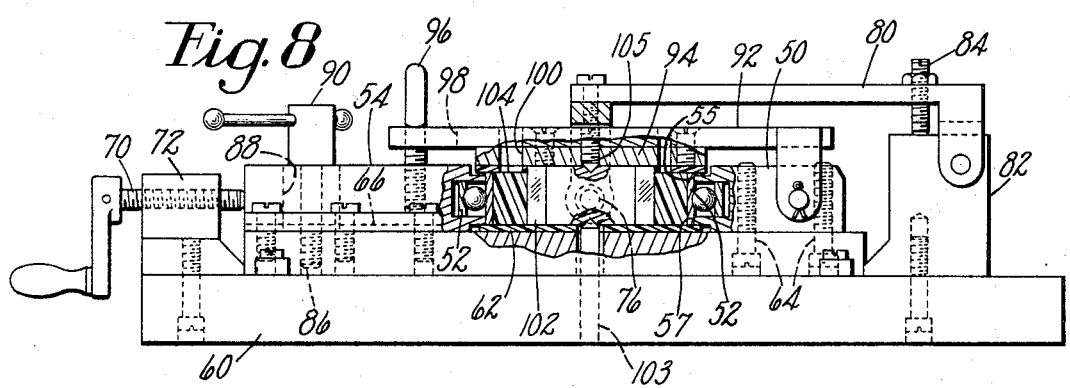

United States Patent Office 3,435,501
Patented Apr. 1, 1969

3,435,501
METHOD AND MEANS FOR MAKING
ELLIPTOIDS
Bruce F. Paul, Ipswich, Mass., assignor to USM Corporation, Flemington, N.J., a corporation of New Jersey
Filed June 22, 1966, Ser. No. 559,624
Int. Cl. B21d 53/12; B21k 1/04
U.S. Cl. 29—148.4                    12 Claims

ABSTRACT OF THE DISCLOSURE

This disclosure pertains to a method and a fixture for producing elliptoids having a preselected dimension along an axis. The invention has particular application, for instance, to precision manufacture of cam-type wave generators requiring predetermined axes and including noncircular bearing rings. Upon radical deflection of originally concentric elements of the desired degree, hardenable material is molded to impose and retain the desired shape in a combination wave generator and bearing assembly, thus eliminating the additive effects of tolerances in the separate parts.

---

This invention relates to the making of cams, and especially elliptoids. More particularly, the invention is concerned with providing improved methods and means for precisely manufacturing lobar wave generators of the type employed in harmonic drive transmissions. While the invention is herein shown and described, for purposes of illustration only, as related to the art of making harmonic drive wave generators of the type employing ball bearing rolling elements, it will be appreciated that the invention is not restricted to the making of such wave generators or to the making of any particular shape or type of elliptoid.

As disclosed, for example, in United States Letters Patent No. 2,906,143, issued Sept. 29, 1959 in the name of C. Walton Musser, rotary actuators (sometimes termed strain wave gearing or harmonic drives) employing controlled deflection waves have notable advantages such as small size for a given torque capacity, high ratio of speed increase or decrease, low back lash, high efficiency, and precise positional control. Mechanism of this type commonly employs three main elements, namely: a rigid circular ring usually formed with spline teeth, a flexible ring or flexspline usually formed with spline teeth meshing at spaced circumferential localities with the circular ring spline teeth, and a rotary lobar wave generator coaxial with the circular ring and flexspline and adapted to deflect the latter from its natural circular form so as to effect and progress the localities of spline engagement. The teeth on the two splines are cut to the same circular pitch. The inner one has fewer teeth than the outer one. The most commonly employed shape of wave generator, and the configuration with which this invention is concerned, is an elliptoid, and its spline tooth differential is two or a multiple thereof to allow symmetrical tooth engagements at diametrically opposite regions, with spline clearance at the minor axis.

While harmonic drives have found ever widening fields of use, a somewhat critical aspect in their manufacture, from the standpoint of both performance and cost, concerns the wave generator. If ground from a circular blank, for example, considerable time is required for processing and there are problems in attaining the uniform precision desired for producing an exact degree of flexspline deflection. Since dimensional difference between the axes of an elliptoid wave generator determines the controlled spline deflection, precision manufacture of the wave shape is highly important.

In view of the foregoing it is a primary object of this invention to provide and improved method for making a closed cam shape, especially an elliptoid such as a wave generator.

A further object is to provide a method for more rapidly manufacturing economical, precise wave generator assemblies including a bearing having noncircular rings. The combination of the wave generator and formed bearing as a pre-shaped unit eliminates the additive effect of tolerances otherwise inherent in the separate parts.

In its structural aspect the invention has for an object to provide a simple fixture for shaping annular elements to provide elliptoids having precisely predetermined major and minor axes.

Another and more specific object is to provide improved mechanism for producing an elliptoid harmonic drive wave generator bearing assembly, the mechanism including means for radially distorting a conventional circular bearing to provide required clearance for its rolling elements, and means for maintaining the assembly in its noncircular, exactly predetermined shape. Desirably, for instance, the major or minor axis of an elliptoid to be produced by the method and means herein disclosed will have a tolerance range of .001 to .002 of an inch or even less.

To these ends a feature of the invention resides in making an elliptoid by providing a rigid form having an elliptoid cavity, placing therein an annular shaping member, the member being radially deformable and having in its natural condition an outer periphery which is elliptoidal and has a major axis equal to and initially alined with that of the cavity, the inner periphery of the member being initially circular, relatively rotating the shaping member and the rigid form about their common center a predetermined number of degrees less than 90 to impose a predetermined length on the minor axis of the inner periphery of the shaping member, filling the latter with a hardenable material, and removing the shaping member from the molded material to provide the elliptoid.

In accordance with a further feature, the method indicated may be specifically adapted to provide harmonic drive wave generator bearing assemblies, the outside diameter of a conventional bearing equaling the inside diameter of the shaping member and the bearing being initially disposed in the shaping member which as relatively rotated as above indicated to deflect the bearing, and the molding material being introduced within the inner ring of the predeterminedly deflected bearing, the assembly thereafter being released when the material has hardened. An alternative method, hereinafter disclosed, features progressive application of diagonal load on an inner bearing race to provide a minor axis and a resultant predetermined major axis in an outer race of the harmonic drive wave generator, the molding material then being provided in the inner ring, fitted with or without a preformed central plug, and allowed to set.

In its physical aspects one feature of the invention pertains to a fixture comprising an elliptoidal cavity, and means rotatable therein to deform an annulus into an elliptoid, the fixture being adapted to form with said elliptoid a cavity for receiving material to be molded in the selected wave shape; another embodiment features a shaping fixture having means for compressively modifying by radial deflection a once-circular bearing, and means defining with said bearing a cavity for receiving a hardenable material to provide a molded elliptoid wave generator bearing with a selected major axis.

These and other features of the invention will best be understood from a consideration of the following specification taken in connection with the accompanying drawings, in which:

FIG. 5 is a perspective view of a cam having a single ring elliptoid with eccentrically mountable core fashioned in a fixture of the general type shown in FIG. 1;

FIG. 6 is a perspective view of an elliptoid wave generator bearing assembly, a portion being cut away, as produced in the fixture shown in FIGS. 7, 8;

FIG. 7 is a plan view with a portion broken away of a compressive type shaping fixture for producing the assembly shown in FIG. 6; and FIG. 8 is a view in front elevation, with a portion broken away, of the fixture shown in FIG. 7.

Figure 1:
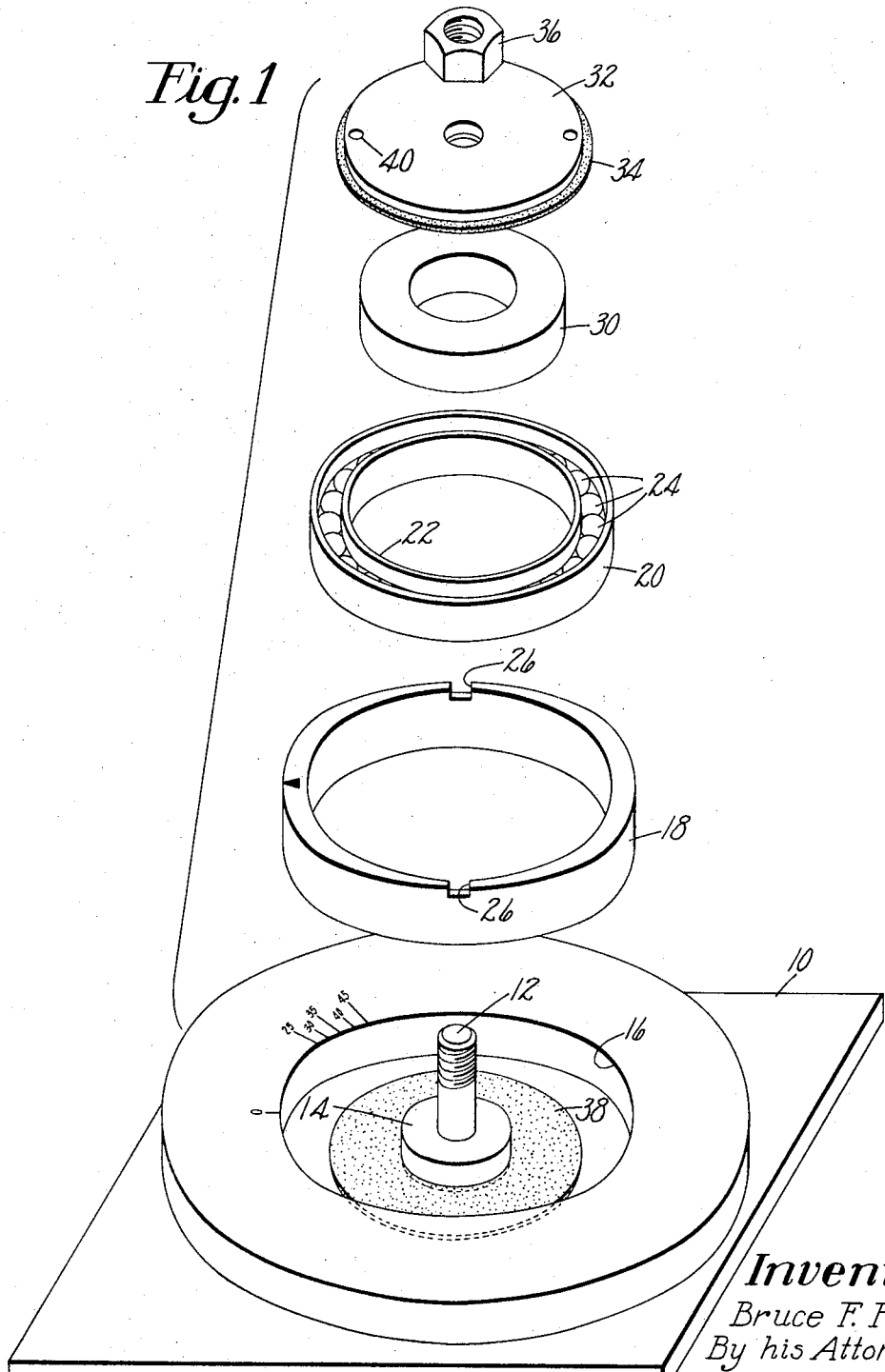
FIG. 1 is an exploded perspective view of the parts of a shaping fixture and a conventional bearing to be shaped and made integral with a harmonic drive wave generator.
Figure 2:
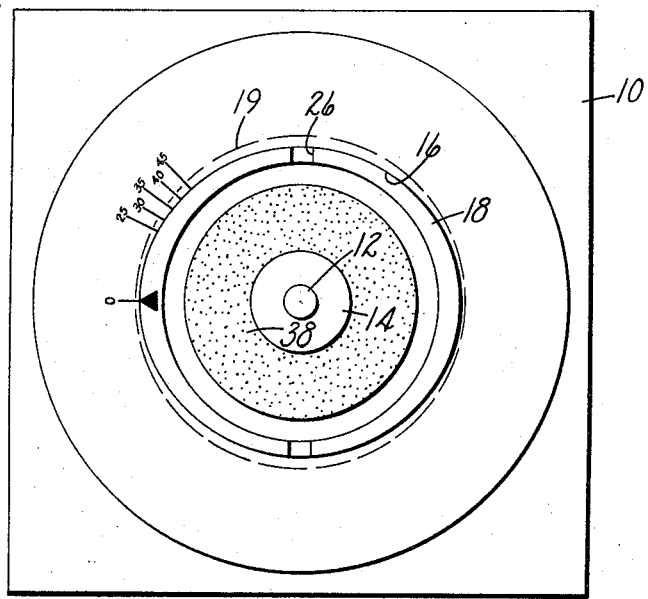
FIG. 2 is a plan view of the base of the shaping fixture shown in FIG. 1 with shaping member in the form of a deformable ring as initially inserted, major and minor axes of the base cavity corresponding angularly to those of the external periphery of the ring.
Figure 3:
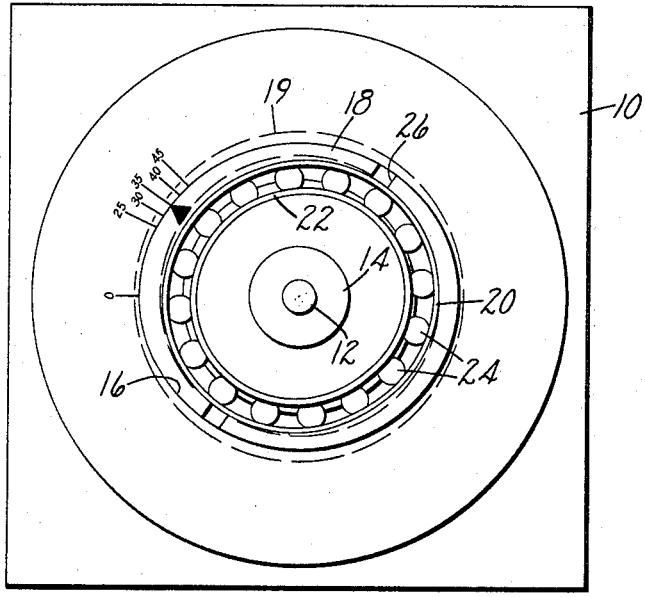
FIG. 3 is a view corresponding to FIG. 2 but with a bearing inserted in the deformable ring, and the ring angularly shifted to deflect the bearing radially.

Referring to FIGS. 1–4 inclusive, a fixture for making selectively shaped elliptoids, especially wave generator assemblies, will be described. A rigid base 10 threadedly receives a vertical stud 12 in an integral central cylindircal collar 14. The base is formed with a cavity 16 having the configuration of an elliptoid, the major axis of which is horizontal in FIGS. 2 and 3 and is indicated by a zero point. Receivable within the cavity is a radially deformable annular shaping member 18 having an outer periphery formed as an elliptoid and an inner periphery initially, i.e., while unrestrained, circular. The member 18 is first disposed with its normal major axis (indicated by an arrow) alined with the major axis of the cavity 16 as indicated in FIG. 2, the lengths of the two major axes being equal. A scale is provided on the base 10 for showing relative angular rotation of the member 18 and its arrow with respect to the zero point of the base. The base 10 may also have inscribed thereon a circle 19 (FIGS. 2, 3) merely to emphasize that the cavity is elliptoidal. The inner diameter of the unrestrained member 18 is substantially equal to the outside diameter of an outer ring 20 of a conventional, initially circular bearing comprising an inner ring 22 and roller elements, in this case balls 24. A ball separator of usual form may be included. To facilitate shaping and manufacture of the elliptoid having preselected axial dimensions by effecting a relative rotation or "crank in" of the shaping member 18 about the axis of the stud 12, i.e., the intersection of major and minor axes, the member may have diagonal slots 26, 26 at its initial minor axis for receiving a spanner wrench.

Figure 4:
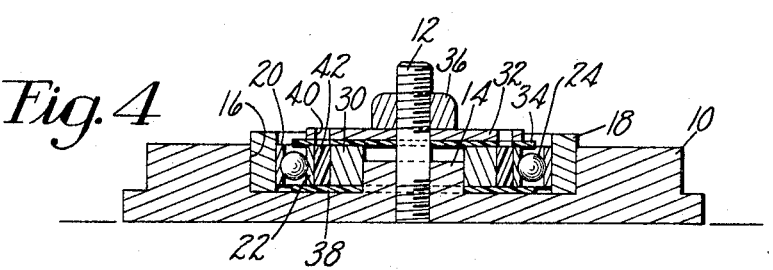
FIG. 4 is a diagonal section of the assembled shaping fixture of FIG. 1 with the bearing deflected as shown in FIG. 3 and a thermosetting filler introduced in position to support the wave generator.

The assemblies shown in FIGS. 1 and 4 optionally include an annular metal plug 30 adapted to receive the collar 14 and having a depth corresponding to that of the bearing ring 22. The bore of the plug may correspond to the diameter of, or be shaped to fit a driving member on, a shaft which is to drive, or be driven by, the wave generator bearing assembly. It will be understood that the hub of the assembly may be entirely filled with hardenable material as shown in FIG. 5 and the plug 30 omitted, or as will be described, be part plug and part moldable material.

By rotating the shaping member 18 away from the zero point of the base 10, the localities of the orignal major axis of the member 18(as indicated by the arrow) come under increasing compression and hence are deflected increasingly inward to impart corresponding deflection to the bearing rings 20, 22. The amount of relative rotation is predetermined by caluculation to make allowance for the sliding fit between the bearing and the fixture, the desired bearing radial clearance, and partially to compensate for the tolerances on the outside diameter of the ring 20 and the tolerance on radial clearance. As to the latter, the normal, i.e., "as manufactured" distribution of the tolerances is considered. The primary objective is to invariably produce an elliptoid having a very reduced tolerance range across the major axis.

When the desired wave shape has been imposed on the bearing by the member 18, a washer 32 having an under layer 34 of Teflon or the like is clamped onto the plug 30 and the bearing by a nut 36 threaded onto the stud 12. A botton lining 38 (preferably of Teflon) together with the washer 32, which is provided with an air vent and a hole 40 for receiving a suitable filler, for instance thermosetting material 42 such as a glass filled phenolic resin, defines, with the inner ring 22 and the plug 30, a mold chamber. When the material has been hardened, by curing of a resin, for example, in a period of about 90 seconds, the solid hub supports the out-of-round bearing with the exact wave shape desired. The wave generator bearing assembly may now be released from the fixture after removal of the nut 36, and inverting and perhaps sharply tapping the base 10. An elliptoidal wave generator has thus been formed and comprises as a rigid, composite unit the plug 30, the then hardened, elliptoidally shaped filler 42, and the then elliptoidal bearing having its inner elliptoidal bearing ring 22 supported by the filler.

It will be noted that, although the fixture and methods as herein disclosed are explained assuming that the elliptoid formed is to operate internally, i.e., has an external elliptoidal shape for cooperating with the inside of a flexspline to be radially deflected outwardly, the methods and similar fixtures are adapted in similar manner to provide a cam shape having an internal elliptoidal periphery for cooperating in known manner with the exterior of a flexspline to be radially deflected inwardly. In other words external as well as internal cam shapes may be formed by practicing the present invention.

FIG. 6 shows a representative elliptoid or wave generator bearing assembly as produced by an alternative form of fixture shown in FIGS. 7 and 8 and practicing an alternate or compressive method of shaping. In this arrangement the initially circular bearing with its balls 48 preferably has a radially deformable inner ring 50 which (though otherwise of usual commercial type) preferably has an axial dimension greater than that of its outer ring 52. The added margins thus provided are arranged to be squeezed across diagonally opposite portions between clamps 54, 56 (FIGS. 7 and 8) of the fixture now to be described.

A base 60 supports a horizontal plate 62 of Teflon or the like on which the bearing assembly (or other circular, radially deflectable ring) is locked between the clamps 54, 56. The clamps 54, 56 have upper and lower arcuate jaws 55 and 57, respectively, which bridge the outer ring 52 and engage the inner ring 50. The clamp 56 is stationary and secured to the base by bolts 64. The clamp 54 is slidable toward and from the fixed jaw 56 in ways 66 of a block 68 affixed to the base 60. Diametric squeezing pressure is progressively directed by the jaws 55 and 57 against the inner ring 50 by operating a clamping screw 70 threadedly extending through a block 72 secured on the base 60 and abutting an end of the clamp 54.

For determining when the wave generator bearing asembly to be made has the desired major axis dimension, a gage 74 (FIG. 7) is mounted with its displaceable sensing finger 76 engaging the outer ring 52 along an axis at right angles to that extending through the mid points of the clamps 54, 56 and in alinement with a yieldable stop 78. The gage and the stop are carried by a lever 80 pivoted to a block 82 secured on the base 60 so that they may be swung between their respective measuring position, as determined heightwise by a setscrew 84 abutting the block 82, and an elevated out-of-the-way position. When the gage 74 registers the desired major axis dimension which is predetermined (based on the major axis required and shrinkage during hardening of the material and other variables relating to degree of desired unit deflection) of the deflected outer ring 52 resulting from minor axis compression of the inner ring 50, the clamp 54 is secured in its ways 66 by a clamping bolt 86. The lower end of this bolt is threadedly received in the base 60, and a mid portion slidably extends in a slot 88 of the clamp underlying an enlarged head 90 of the bolt. A clamping cover 92 provided with a molding cavity lining 94 preferably of Teflon is pivoted to the fixed clamp 56 and is now secured in its molding position, as shown in FIG. 7, by means of a thumb screw 96 threadedly received in the jaw 54 and having a head spanning a slot 98 of the cover 92. This cover is formed with a hole 100 disposed between the inner ring 50 and an optional cylindrical core 102 which is positioned by alined conical ends of a pin 103 fixed in the base and a screw 105 in the cover 92. The core generally serves to increase stiffness in the completed assembly. When used, the core 102 provides a center bore and keyway for a mounting shaft or coupling as shown in FIG. 6. Potting material 104, for instance the thermosetting glass filled phenolic resin previously mentioned, is introduced through the hole 100 to fill the mold cavity or to fill that portion not occupied by the core 102. The minimum radial thickness of the filler between the core and the inner ring 50 should be on the order of 0.10". After the material 104 has been set, the wave shape imposed on the now elliptoid ring 52 will be accurately formed and maintained after removal of the wave generator bearing assembly from its fixture.

The alternate approach just described eliminates the effect of bearing outside diameter and radial clearance tolerances on the resultant major axis. This permits use of low cost, commercial bearings, commonly considered as onground bearings, having relatively loose tolerances on applications where such bearings were not heretofore practical.

Both fixtures and their respective methods in addition to improving production rate and lowering costs, have been found to provide a high degree of uniformity or "repeatability" in output. It has thus become possible predictably to provide, for instance, cams or wave generator bearing assemblies of a standard type, the major diameters of which have a maintained tolerance on the order of ±.0005". It will be understood that compensation may be made in practicing the methods described for such features as shrinkage, if any, in a selected hardenable filling material, and desired radial clearance in the bearing. Using a hardenable core material with known shrinkage, the fit to the inner ring of the bearing to the hub, molded in this case, is more repeatable than to a ground hub thus insuring the provision of wave generators with more repeatable radial clearance. Since the inner ring forms the mold, the inside diameter tolerance on the bearing can be allowed to be extremely loose initially and the surface need not be ground thus lowering cost.

Having thus described my invention, what I claim as new and desire to secure by Letters Patent of the United States is:

1. The method of making an elliptoid comprising providing a radially deformable annular member, straining the member diametrically to a lobar shape having an axis of preselected dimension, and filling at least a portion of the cavity provided by the deflected member with a hardenable material for peripherally supporting said shape and maintaining said dimension.

2. The method of making an elliptoid comprising providing a rigid form having an elliptoidal cavity, placing therein an annular shaping member, the member being radially deformable and having, in its natural condition, an outer elliptoidal periphery which has a major axis equal to and alined initially with that of the cavity, the inner periphery of the shaping member being initially circular, relatively rotating the shaping member and the rigid form a predetermined number of degrees less than 90 about their center to impose an elliptoidal shape on said inner periphery, and filling at least a portion of the latter with hardenable material to sustain said shape when the shaping member is removed.

3. The method of shaping a harmonic drive wave generator bearing assembly comprising providing a rigid form having an elliptoidal cavity, placing therein an annular shaping member, the member being radially deformable and having, in its natural condition, an outer elliptoidal periphery with a major axis equal to and initially alined with that of the cavity, the inner periphery of the shaping member being initially circular, coaxially placing in said shaping member a bearing having rolling elements constrained between circular inner and outer rings, the diameter of the outer ring corresponding to the diameter of the inner periphery of the shaping member, and relatively rotating the shaping member and said form a selected number of degrees less than 90 about a common center to shape said inner ring, at least partly filling the latter with hardenable core material, and removing the bearing with its supporting core from the shaping member.

4. The method of making a harmonic drive wave generator assembly comprising providing a bearing consisting of roller elements constrained by circular inner and outer bearing rings, applying increasing compression across said inner ring to shape the outer bearing ring by deflection until a predetermined length of major axis extends therein normal to the direction of said compression, at least partly filling said inner ring while under compression with core hardenable material, and thereafter releasing the inner ring from said compression to permit the bearing as shaped to be supported by the core material.

5. A fixture for making elliptoids comprising means for holding a radially deformable ring, means for straining the ring while constrained in said holding means by applying external deforming forces in its general plane until a predetermined major axis dimension is provided in the ring, and mold cavity forming means closable on the ring holding means when said axis dimension is attained to enable reception of a settable plastic for fixing said dimension in the deformed ring.

6. A fixture for making elliptoids comprising a rigid base having a cavity formed with an elliptoidal periphery, an elliptoidal, annular shaping member concentric with and mounted in said cavity, the member being radially deformable and having, in its natural condition, a major axis equal to and alined with the major axis of the cavity and an inner circular periphery, and means movable into and out of mold-forming relation with said shaping member when it and the base have been relatively rotated about their common center less than 90°.

7. A fixture as set forth in claim 6 wherein the shaping member is adapted to receive a deformable circular bearing the outside diameter of which initially corresponds to the inside diameter of the member, and the means movable into mold forming relation includes a cover adapted to be releasably secured to a side of the bearing, the cover having a hole spaced for the reception of hardenable material within an inside diameter of the bearing.

8. A fixture for making an elliptoid wave generator bearing assembly comprising a frame, a pair of clamping jaws mounted thereon, means for moving at least one of the jaws with respect to the other diametrically to strain therebetween at least one of an inner and outer ring of a bearing, and means cooperative with at least one of the radially deflected rings to provide a mold cavity for the reception of hardenable material for maintaining the deflected shape of the bearing.

9. A fixture as set forth in claim 8 wherein a gage is mounted for determining radially deflection of one ring of the bearing in a direction normal to that of the compression applied by said jaws to the other ring.

10. A fixture for making harmonic drive wave generator bearing assemblies comprising a frame, a pair of relatively movable, arcuate clamping jaws mounted on the frame for diametrically squeezing one of an inner and outer ring of a normally circular ball bearing, means for locking the jaws in ring squeezing position when the major axis of the other ring reaches a predetermined dimension, and mold forming means movable into and out of engagement with the bearing to provide a cavity for receiving a hardenable material for supporting and maintaining the deformed shape of one of said bearing rings.

11. A fixture as set forth in claim 10 wherein said mold forming means is adapted detachably to carry a core into concentric relation with said cavity.

12. In a fixture for forming wave generator bearing assemblies, a pair of relatively movable, arcuate jaws arranged to deflect diametrically one of an inner and outer ring of a naturally circular bearing, and a pair of parallel plates respectively engageable with the sides of one of said rings to form a mold cavity with the deflected bearing, one of said plates being formed with a hole for receiving hardenable material.

References Cited

UNITED STATES PATENTS

| | | | |
|---|---|---|---|
| 2,906,143 | 9/1959 | Musser | 74—640 |
| 2,913,859 | 11/1959 | Koch | 29—148.4 X |
| 3,009,748 | 11/1961 | Pitner | 29—148.4 X |
| 3,061,887 | 11/1962 | Clarke | 264—242 X |
| 3,249,986 | 5/1966 | Adkins | 29—148.4 |

THOMAS H. EAGER, *Primary Examiner.*

U.S. Cl. X.R.

29—200, 201, 149.5, 527; 74—640; 264—242